United States Patent Office 2,725,189
Patented Nov. 29, 1955

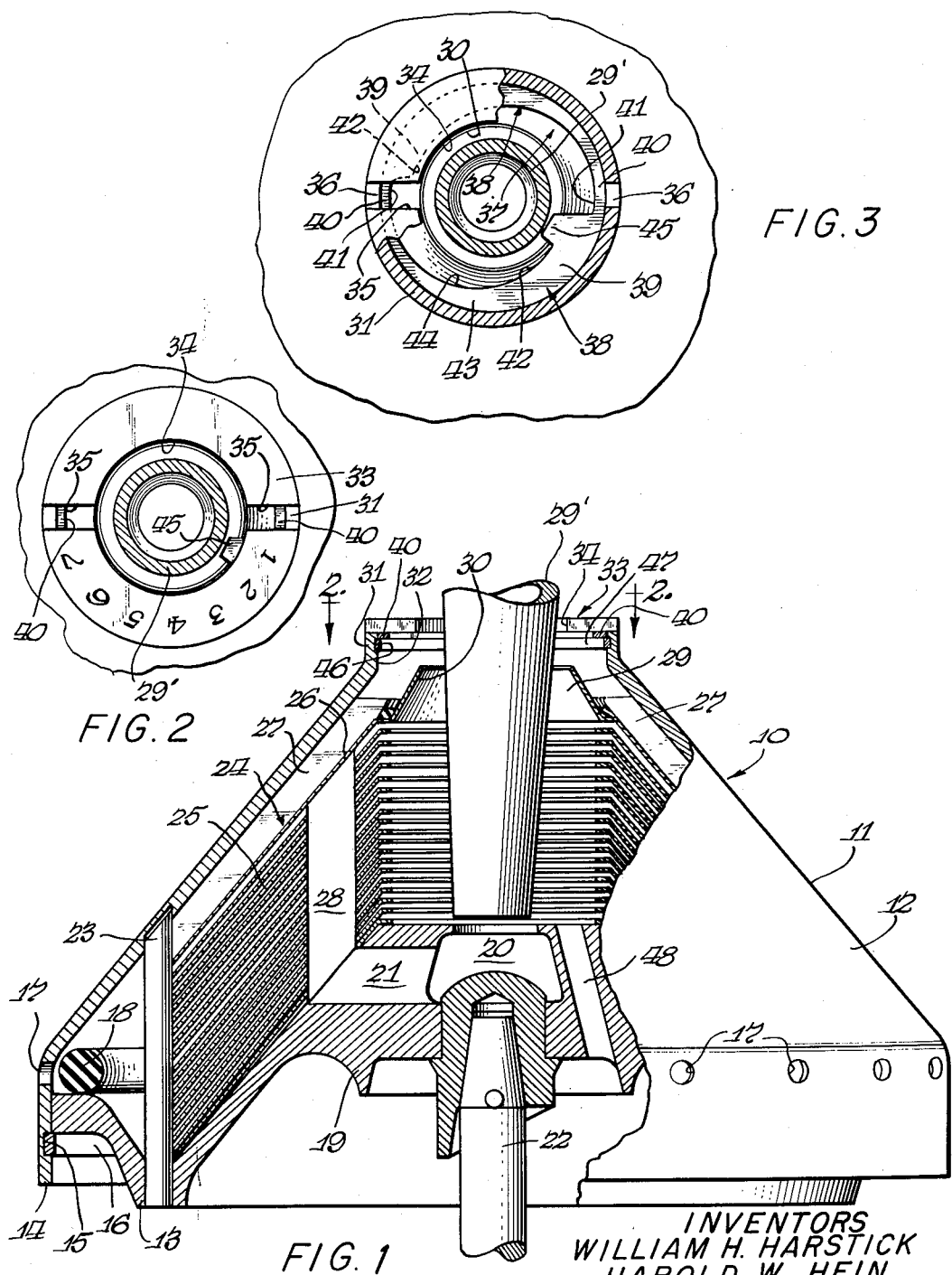

2,725,189

DISC TYPE REGULATOR FOR CENTRIFUGAL SEPARATOR BOWL

William H. Harstick, Oak Park, and Harold W. Hein, Chicago, Ill., assignors to International Harvester Company, a corporation of New Jersey Application May 10, 1954, Serial No. 428,757

1 Claim. (Cl. 233—29)

This invention relates to a centrifugal separator and particularly to a cream separating bowl. More specifically this invention relates to a regulator for controlling the discharge of liquids from a cream separator bowl.

Conventional cream separators generally consist of upper and lower casing members connected together to form a separating chamber. Generally a plurality of frusto-conical discs are disposed within the separating bowl in superposed relation. Liquid to be separated is directed to the central open spaces of the discs, and downwardly into a distributor chamber formed in the lower portion of the bowl. The distributor chamber directs the whole milk to a plurality of vertically extending passages formed by openings in the discs which are in vertical registry. The separating bowl has the separating discs arranged so that the cream or lighter constituent of the liquid is drawn from the bowl near a point adjacent the inner peripheral edges of the separating discs. On the other hand the heavier constituents of liquid or as in this case skim milk, is drawn from the separating bowl at a point which is located at the upper end of the bowl. At this location holes or openings are provided in a neck portion of the upper casing wall and the skim milk flows from the bowl through these openings or passages. In the conventional constructions these openings or passages have been generally controlled by threaded screw type control members. A control is desirable since by regulating the discharge passages to permit a greater outflow, or to permit a greater discharge of skim milk, a heavier cream content is obtained. On the other hand by closing the discharge passages to permit a lesser outflow of skim milk, a lesser density cream content is obtained during the discharge of cream. The screw type regulators or controls for the skim milk discharge openings have not proved entirely satisfactory, have been expensive to produce, and are inaccurate since they must each be adjusted individually for each discharge opening. It is a prime object of this invention therefore, to provide an improved regulator for controlling the discharge of skim milk from a cream separating bowl.

A still further object of this invention is to provide a skim milk regulator for a separating bowl, the regulator including provisions whereby the same may be readily removed for cleaning purposes.

A still further object is to provide an improved regulator for regulating a discharge orifice of a cream separator, the regulator comprising a single element which is movable in relation to the discharge orifices simultaneously controlling the discharge capacity of both orifices during such movement.

Still another object is to provide an improved regulator for controlling the skim milk discharge orifices of a centrifugal separator, the regulator including a disc having inner cam like or spirally disposed metering surfaces adapted to be moved in relation to the discharge orifices for regulating the discharge capacity of said orifices.

These and other objects will become more readily apparent from a reading of the specification when examined in connection with the accompanying sheet of drawing.

In the drawing:

Figure 1 is a side elevational view of a cream separating bowl with portions broken away to show the interior of the same;

Figure 2 is a view showing the top of a cream separating bowl, the view being taken substantially along the line 2—2 of Figure 1; and Figure 3 is a view similar to Figure 2 of the top portion of a cream separating bowl, the view having certain portions broken away to show a skim milk regulator.

Referring now particularly to Figure 1 a centrifugal separating bowl of the cream separating type is generally designated by the reference character 10. The bowl 10 comprises a casing 11 which includes an upper bowl part 12 and a lower bowl part 13. The upper bowl part 12 has a skirt portion 14 which is provided with an annular recess 15. A split ring 16 is disposed in the recess 15 for, the said ring 16 being positioned to retain the upper and lower bowl parts 12 and 13 respectively in assembly.

The separating bowl is of the power washing type wherein during certain speeds of operation the bowl may be flushed with a washing liquid. For the purpose of permitting the discharge of washing liquid, a plurality of discharge openings 17 are provided into the skirt portion 14. A rubber sealing expansible ring 18 is adapted to move outwardly under high speeds of operation for closing the discharge openings 17.

A hub 19 on the lower bowl portion 13 is provided with a distributor chamber 20. The distributor chamber 20 is in communication with a plurality of radially extending passages 21, only one of which is shown in Figure 1. A drive connection 22 is connected to a suitable motor for rotating bowl 11. A plurality of posts 23, only one of which is shown, are disposed within the casing 11. The posts 23 provide supports for a disc pack 24 comprising a plurality of frusto-conical separating discs 25. The frusto-conical discs 25 are placed in superposed relation within the casing 11 and a top disc 26 includes a plurality of wings 27 which are circumferentially spaced within the casing 11 and are in engagement with the upper bowl part 12.

The frusto-conical discs are suitably apertured to provide a plurality of vertically extending passages 28, only one of which is shown, which are in communication with the distributor passages 21. The disc pack 24 is provided with a central open space 29 into which a milk distributor tube 29' projects for delivering whole milk to the distributor 20. An inlet funnel 30 is connected to the top disc 26, this funnel normally being adapted to receive and direct washing liquid to the space 29 during a washing operation.

The upper bowl portion 12 is provided with a collar or neck portion 31 having an inner wall 32. The upper end of the neck 31 is provided with a transversely extending flange 33 having an inner peripheral edge defining an opening 34. As best shown in Figures 2 and 3, the flange 33 is provided with a pair of opposed apertures 35, which as indicated particularly in Figure 3 at 36, open outwardly of the neck 31. A regulating disc generally designated at 37 is positioned adjacent to the apertures 35. The regulating disc 37 comprises a pair of connected and oppositely disposed control members designated generally at 38. Each control member 38 is provided with a wide or high portion 39 spaced substantially close to the axis of the bowl and spaced inwardly of the inner wall 32. Each control member 38 is also provided with a low or narrow portion 40 spaced outwardly of the axis of the bowl and substantially close to the inner wall 32. The low portion 40 includes an inner surface 41 and the high portion 39 includes an inner surface 42. An arcuate or spirally shaped cam portion 43 connects the low portion 40 and the high portion 39 of each control member 38. The spirally shaped portion 43 includes an inner spiral surface 44 connecting the surfaces 41 and 42. This specific description indicates that what is obtained is actually a metering surface on the inner portion of each control member 38, which surface is spirally or cam shaped. A projecting shoulder 45 is integrally formed with one of the control members 38, and as indicated best in Figure 2, this projecting shoulder 45 extends inwardly toward the axis of the disc so that ready access may be had thereto. The regulating disc 37 is suitably held in position for quick removal by means of a recess 46 formed in inner wall 32 of the neck 31. A split ring 47 is seated in the recess for maintaining the regulating disc 37 in position.

It is believed that the operation of a centrifugal separator is well known to those skilled in the art. However, for the purpose of clarity, the separating operation will be summarized. Whole milk is directed through the milk distributor tube 29' to the distributor chamber 20. The bowl is rotating at a speed of approximately 14,000 R. P. M. and the whole milk is forced outwardly through the passages 21 into the passages 28. At this point the whole milk is distributed to the spaces between the discs 25, the heavier constituents of the whole milk, such as skim milk, are forced outwardly against the inner wall of the upper bowl part 12 and the lighter constituents namely the cream is forced inwardly until a vertical annular column of cream is built up immediately adjacent the inner peripheral edges of the separating discs. The skim milk is forced upwardly above the top disc 26 and is thereupon directed to the discharge apertures 35 for discharge to a suitable container. The lighter constituents such as cream, are directed downwardly and escape through the cream discharge passage 48 formed in hub portion 19.

Assuming that the discharge apertures 35 are completely unrestricted a maximum discharge of skim milk occurs and because of the unrestricted nature of the apertures 35 a relatively thick high cream content cream is discharged through the passage 48. In order to reduce the cream content and to regulate the same within a certain range, the regulating disc 37 is provided. As indicated in Figure 2 a number of indices beginning with 1 to 7 inclusive, are etched on the upper surface of the flange 33. This range can be considered the range within which regulation of the skim milk and cream is maintained.

As indicated in Figures 2 and 3, the surfaces 41 are so arranged, in this particular position of the regulating disc 37, that a relatively large amount of liquid can escape through the apertures 35 since the apertures 35 are comparatively unrestricted. On the other hand, if the operator wishes to reduce the high cream content of the cream as it flows through the passage 48 he merely engages the projecting shoulder 45 by means of a suitable tool and rotates the same opposite to any one of the indices indicated. This rotation of the disc 37 progressively reduces the cross-sectional area of the apertures 35 or restricts the same, whereupon as a result less skim milk is discharged and more of the skim milk remains within the bowl to be discharged with the cream through the passage 48. Thus by moving the surface 42 into position wherein it is positioned underneath the discharge apertures 35, a maximum restriction takes place and a large area of the apertures 35 is masked. Thus the discharge of skim milk is substantially reduced and more of the skim milk will be maintained with the cream as it is discharged through the passage 48.

It can be seen that by simply rotating the disc 37 to the number of positions indicated, progressively greater or less heavier constituents can be discharged with the milk. The heavier constituents of course are water and the term skim milk indicates a high water content milk which may be discharged through the skim milk apertures. By virtue of the cam shaped or spirally formed surfaces on the control members an accurate control of the cream content is possible. Thus the operator can very carefully gage and determine what the cream content of his cream should be in any given instance and repeated accuracy is assured. The regulator is very accurate and effective and can easily be removed for cleaning by merely removing the snap ring 47.

Thus it can be seen that an improved cream regulating device for centrifugal cream separators have been provided. It is believed that the advantages have been fully set forth and the objects of the invention fully achieved. It must be realized that changes and modifications may be made without departing from the spirit of the invention as disclosed or the scope thereof as defined in the appended claim.

What is claimed is:

A centrifugal separating bowl comprising upper and lower connected casing members, a plurality of separating discs within said bowl, an annular neck portion on said upper casing member, said neck portion including an annular inner wall providing a passage for the entrance of liquid into said bowl, a flat annular flange connected to said neck portion, said flange extending inwardly and laterally with respect to the axis of said bowl, the flange having an inner peripheral edge defining an opening in communication with said passage, said flange having oppositely disposed discharge slots, means regulating the discharge of heavier constituents of fluid from said bowl comprising a regulating disc positioned in the neck of said upper casing member in contiguous and relative sliding relation with respect to said flange, said regulating disc having a pair of inner cam-shaped peripheral surfaces, the surfaces having oppositely disposed high portions near the axis of said bowl, and oppositely disposed low portions disposed outwardly of said high portions, an arcuate surface connecting the high and low portion of each cam-shaped surface, a key connected to said disc and extending inwardly toward the axis of said bowl, whereby said disc may be rotated and any portion of said cam-shaped surface may be positioned immediately adjacent said oppositely disposed discharge slots, a recess in the inner wall of said neck, and a split ring disposed in said recess for maintaining said disc in relative position with respect to said flange.

References Cited in the file of this patent

UNITED STATES PATENTS

| 935,183 | Wolf | Sept. 28, 1909 |

FOREIGN PATENTS

| 26,228 | Sweden | Jan. 16, 1909 |
| 425,150 | Germany | Feb. 11, 1926 |